Feb. 23, 1971 J. D. REYNOLDS 3,566,376

MULTIPLE-ELEMENT STORAGE DEVICES

Filed Dec. 11, 1967 2 Sheets-Sheet 1

Inventor
J. D. REYNOLDS
By
Cameron, Kerkam & Sutton
Attorneys

Inventor
J. D. REYNOLDS
By Cameron, Kerkam & Sutton
Attorneys 3,566,376

MULTIPLE-ELEMENT STORAGE DEVICES

John David Reynolds, Bracknell, England, assignor to Ferranti, Limited, Hollinwood, Lancashire, England, a company of Great Britain and Northern Ireland
Filed Dec. 11, 1967, Ser. No. 689,502
Int. Cl. G11c *5/08, 7/00, 11/06*
U.S. Cl. 340—174 4 Claims

ABSTRACT OF THE DISCLOSURE

A magnetic core store comprises a number of pairs of bit planes each having separate sense wires. Each column conductor passes through cores in both planes of a pair, and pairs of column conductors are interconnected at a point between the two planes of a pair.

This invention relates to multiple-element coincident-current storage devices, and particularly to such stores of the three-wire type.

The term "magnetic core" is used in this specification to include also magnetic storage elements of other types than the simple core, such as those elements formed by apertures in plates of magnetic materials, and thin-film storage devices.

Known kinds of three-wire multiple-plane coincident-current magnetic core store are provided with two sets of input conductors, usually referred to as X and Y, or row and column conductors. Each bit plane of the storage is also provided with at least one sensing wire. The actual arrangement of the input conductors may be varied. The basic wiring arrangement provides a separate Y conductor for each column of cores in the store, whilst each X conductor is associated with one row of cores in each of the bit planes. However, this basic arrangement is rarely used. One known arrangement results from connecting pairs of X conductors in series. If currents of the appropriate value are passed along one such pair of X conductors and one Y conductor, two cores will be subjected to the effect of the two currents. However, the cores are arranged such that the two currents assist one another at one core and oppose one another at the other core. Hence only one core is actually selected. It has also become necessary to make provision for current flow in either direction along either X or Y conductors in order to select one or the other of the two cores for writing purposes. This presents no technical problem since, in order to read a core, the currents have to flow in the opposite direction to the writing currents.

A second known arrangement results from connecting pairs of Y conductors in series.

Neither of these arrangements give the most satisfactory results in terms of disturbance noise from cores which are subjected only to one current pulse or in terms of providing equal numbers of cores associated with each X and Y conductor. These two factors of noise and balance are important in the design of magnetic core stores.

An object of the invention is to provide a wiring arrangement for a multiple-element coincident-current magnetic core store which provides better results in terms of noise and balance than has hitherto been possible.

According to the present invention a multiple-element coincident-current storage device includes $p$ pairs of bit planes, where $p$ is two or more, each having $m$ rows and $n$ columns of magnetic storage elements, where $n$ is even; $m$ row conductors each traversing one row of storage elements in each one of said bit planes; $pn$ column conductors each traversing one column of storage elements in each of a said pair of bit planes and having a connection at a point between the two columns of storage elements traversed by it to a corresponding point on one only of the other column conductors traversing columns of storage elements in the same pair of bit planes; and means for passing electric currents in either direction along selected row and column conductors.

The invention will now be described with reference to the accompanying drawings which relate to a three-wire magnetic core store.

Figures 3A, 3B, 3C, 3D:
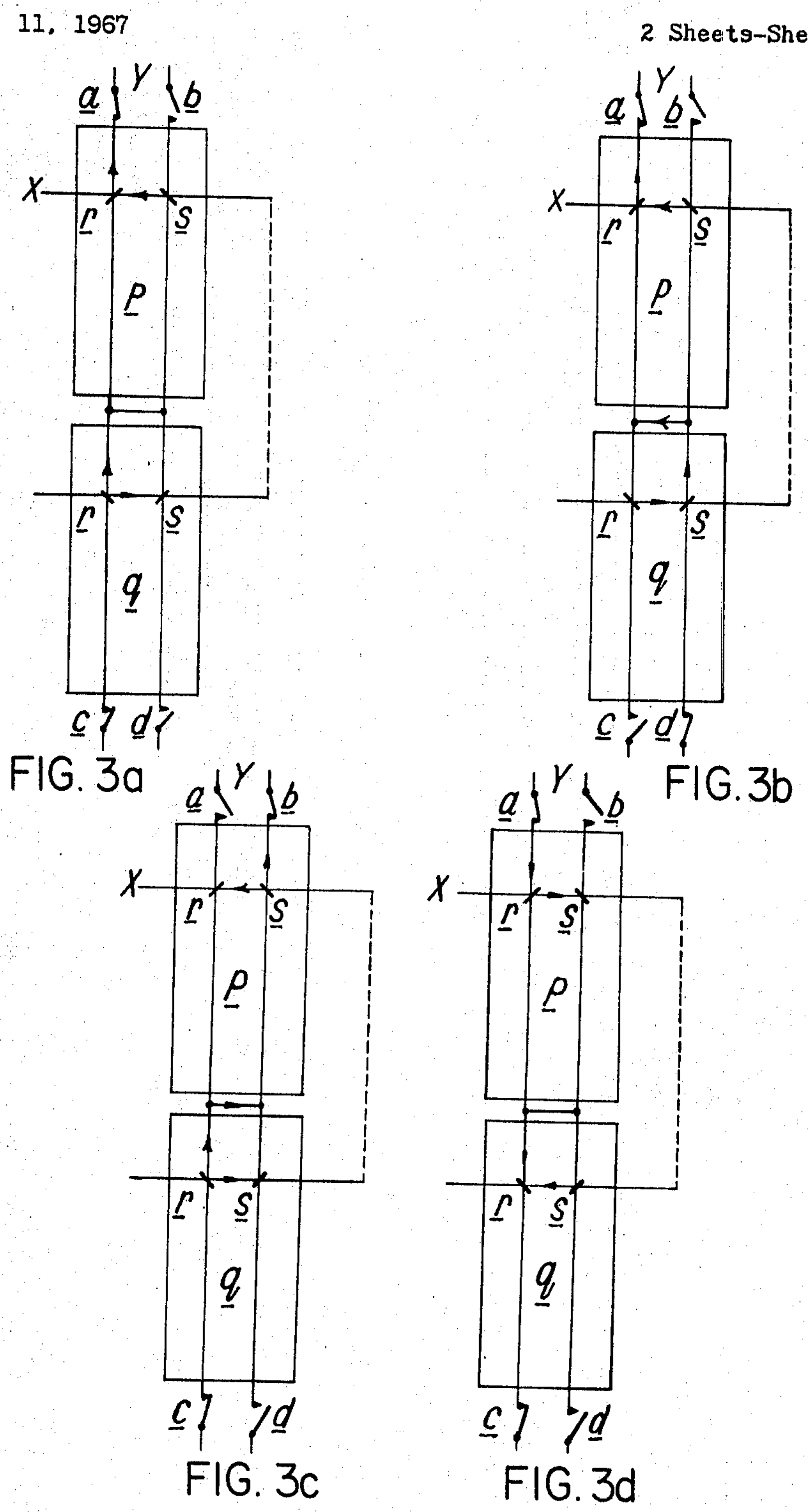

FIG. 3 is schematic view of a single pair of bit planes from the store and is divided into four sections represented as FIG. 3(*a*), FIG. 3(*b*), FIG. 3(*c*) and FIG. 3(*d*). FIG. 3(*a*) illustrates the driving condition when it is required to write information into cores *rp* and *rq*. FIG. 3(*b*) illustrates the driving situation when it is desired to write information into core *rp* and not into *rq*. FIG. 3(*c*) illustrates the condition where core *rq* is switched by current flow of Y conductor through cores *rq* and *sq*. FIG. 3(*d*) illustrates the condition for switching of cores *rp* and *sq*.

Figure 1:
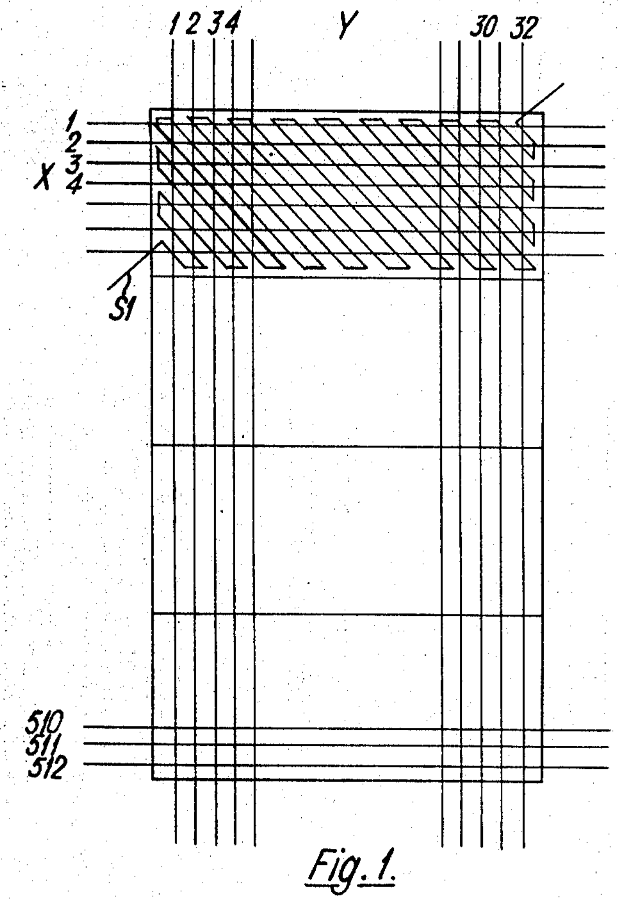
FIG. 1 is a schematic view of a single 16,384-word bit plane.

Referring now to FIG. 1, a single 16,384-word bit plane has 32 column conductors, hereafter referred to as Y conductors, and 512 row conductors, referred to as X conductors. A magnetic core is located at the intersection of each X conductor with each Y conductor, giving a total of 16,384 cores in each bit plane. Each bit plane is divided into four parts for sensing purposes, and each part has a separate sensing wire, which passes through all the 4096 cores in that part of the store. Only one of the sensing wires is shown, by the reference S1. For the sake of clarity, most of the X and Y conductors, and the actual cores themselves, have been omitted.

Figure 2:
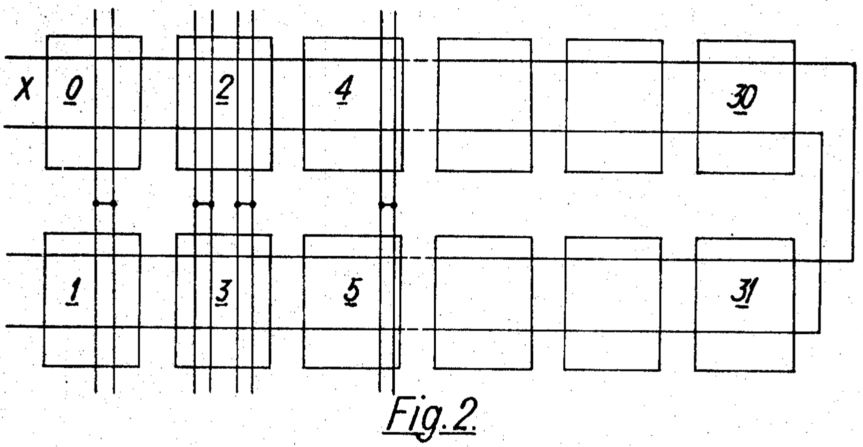
FIG. 2 shows the arrangement of the row and column conductors in the store.

FIG. 2 shows the arrangement of some of the bit planes in a 32-bit store. The planes are arranged in two rows of 16, though this need not be the actual physical arrangement. Again only a few of the X and Y conductors are shown. As shown in FIG. 2 each X conductor passes through one row of cores in each of the 32 planes. Each Y conductor passes through one column of cores in each of two planes. Pairs of Y conductors are connected together at a point between the two planes. As shown in FIG. 2, adjacent conductors are connected together, though the arrangement may be varied. Each X conductor will pass through a total of 1024 cores (i.e. 32 x 32), and each Y conductor will also pass through 1024 cores (i.e. 512 x 2). Thus the power requirements for the X and Y drive circuits will be the same.

Each one of the 32 planes in the store is of the form shown in FIG. 1. As is usual with two-coordinate stores, any particular core may be selected by passing currents along the two conductors which meet at the desired location in the store. Only the one selected core will be switched, but a number of other cores will be disturbed and will produce a noise voltage in the sense wire. Since each X conductor passes through 32 cores in the planes, one will be switched completely and 31 will be disturbed. Similarly each Y conductor passes through 512 cores and all of these will be disturbed. However, since there are four sense wires, only 128 cores will be associated with each, and one of these 128 cores will be switched, the remaining 127 being disturbed. Hence the total number of cores producing only a spurious noise voltage in the sense wire associated with the switched core will be 158 i.e. 31+127. Since the location of a core being switched is known, the four sense wire outputs may be strobed so that only the output of the required sense wire is used, thus eliminating the noise produced in the other three sense wires.

FIG. 3 shows a single pair of planes under four different conditions. In each case a single X conductor and a pair of Y conductors are shown. Each end of each Y conductor is shown as being connected to a switch, the four switches *a*, *b*, *c* and *d* shown representing the Y drive selection circuitry.

The operation of the store will be described with reference to FIG. 3. Each part of this figure shows a pair of planes, referred to as bit *p* and bit *q*. A single X conductor is shown which passes through a row of cores in both bit planes. Two Y conductors are shown, each passing through both planes. The two intersections between the X conductor and one Y conductor define the location of a core *r* in each plane, and the two intersections between the X conductor and the other Y conductor define the location of two cores *s*. The four switches *a*, *b*, *c* and *d* are connected as already described.

As is well known a core may have information written into it by switching it from a first state to a second state, and the information is read out by switching the core in the opposite direction. Therefore if two half-currents flow in a particular direction to write information into a core, then both these half-currents require to be reversed in order to read the information out of the core. The reversal of one or the other of the two half-currents will simply cause one to cancel out the effect of the other.

It will be noticed in FIG. 3 that the two cores on the same X conductor at locations defined by two interconnected Y conductors are oppositely poled; thus core *r* is read, for example, by two half-currents flowing in a certain direction, and core *s* is read by reversing one of these two currents. It is assumed for the purpose of this description that in order to write information into the store, current in the Y conductors must flow upwards as shown in FIG. 3(*a*). The direction of current flow in the X conductors depends upon the location of the required core. Cores in the two columns associated with a pair of interconnected Y conductors require opposite directions of current flow to enable information to be written into them.

Consider first the case where it is required to write information into the cores *r* in both of the planes *p* and *q* (i.e. into cores hereafter referred to as *rp* and *rq*). Current in the X conductor is caused to flow from left to right in plane *q* and from right to left in plane *p*, as shown in FIG. 3(*a*). Switches *a* and *c* are closed and current caused to flow upwards along the left-hand Y conductor. The direction of current flow in the two conductors is such that both cores *rp* and *rq* are switched. Cores *sp* and *sq* may be switched by closing switches *b* and *d* instead of *a* and *c*.

If it is required to write information into, say, core *rp* and yet not into core *rq*, then the current flowing in the Y conductor must be diverted away from core *rq*. FIG. 3(*b*) shows how this is done. The X conductor current flows as before. Switches *a* and *d* are closed so that the Y conductor current flows through cores *rp* and *sq*. The two half-currents combine at core *rp* and cause it to switch, but at core *sp* they cancel out, and hence no core in plane *q* is switched.

In a similar manner, as shown in FIG. 3(*c*) core *rq* may be switched by causing the Y conductor current to flow through cores *rq* and *sp*. At core *rq* the two half-currents combine to switch the core, whereas at core *sp* they cancel out.

In order to switch cores *sp* and *sq* it is necessary to reverse the current flowing in the X conductor.

When it is required to read out the information in the store, corresponding bits in each bit plane are interrogated simultaneously. The Y conductor current is caused to flow downwards, as shown in FIG. 3(*d*). The direction of current in the X conductor shown in FIG. 3(*d*) will cause cores *rp* and *rq* to be interrogated. Cores *sp* and *sq* are interrogated by reversing the direction of the X conductor current.

Usually the planes will be arranged in such a manner that the two planes of a pair are located on opposite sides of an insulating plate though other arrangements are possible.

As described above, each Y conductor requires a switch at each end, and each X conductor requires a single switch. These switches will usually be semiconductor devices. It is usual to provide a matrix arrangement of switches so as to reduce the number required. For example instead of providing 512 switches for the X conductors it is possible to use an arrangement of 48 switches only. Rather more switches are required for the Y conductors since there are 16 sets of 32 conductors, necessitating the use of 12 switches for each pair of planes, and giving a total of 192 switches.

The three-wire system is more economical than the four-wire system from a consideration of electrical power consumption. This is because there are no inhibit conductors for which drive circuits have to be provided. Furthermore, in order to drive 32 bit planes, it is only necessary to provide 16 Y-currents, since each Y conductor passes through two bit planes.

The system already described may be used with a two-wire store of the type in which one of the sets of conductors is used both for writing and sensing-purposes.

What I claim is:

1. A multiple-element coincident-current storage device including *p* pairs of bit planes, where *p* is two or more, each having *m* rows and *n* columns of magnetic storage elements, where *n* is even; *m* row conductors each traversing one row of storage elements in each one of said bit planes; *pn* column conductors each traversing one column of storage elements in each of a said pair of bit planes and having a connection at a point between the two columns of storage elements traversed by one of the column conductors to a corresponding point on one only of the other column conductors traversing columns of storage elements in the same pair of bit planes, and means for passing electric currents in a predetermined direction along a selected one of the row conductors and one only of the two interconnected column conductors of each plane of a pair of bit planes, the two storage elements in each plane traversed by the same row conductor at locations defined by the two interconnected column conductors being oriented such that two storage elements are oppositely poled.

2. A storage device as claimed in claim 1 in which each said connection is made between column conductors traversing adjacent columns of storage elements.

3. A storage device as set forth in claim 1 wherein each bit plane is divided into four parts for sensing purposes, each part including a separate sensing wire which passes through each core in the corresponding part of each bit plane.

4. A storage device as set forth in claim 3 wherein each said connection is made between column conductors traversely adjacent columns of storage elements.

References Cited

UNITED STATES PATENTS

| | | | |
|---|---|---|---|
| 3,432,827 | 3/1969 | Sarno | 340—174 |
| 3,432,835 | 3/1969 | Foglia | 340—174 |

BERNARD KONICK, Primary Examiner

S. B. POKOTILOW, Assistant Examiner